United States Patent [19]

Tanikoshi et al.

[11] 3,747,487
[45] July 24, 1973

[54] AN EXPOSURE CONTROL SYSTEM FOR A PHOTOGRAPHIC SYSTEM

[75] Inventors: Kinji Tanikoshi; Tomoshi Takigawa, Tokyo, both of Japan

[73] Assignee: Canon Kabushiki Kaisha, Ota-Ku, Tokyo, Japan

[22] Filed: Apr. 10, 1970

[21] Appl. No.: 27,282

[30] Foreign Application Priority Data
Apr. 17, 1969 Japan.............................. 44/35263

[52] U.S. Cl. ............... 95/10 CD, 95/64 D, 352/141
[51] Int. Cl. ............................................. G03b 7/10
[58] Field of Search...................... 95/10, 64, 10 CD, 95/64 D; 352/141

[56] References Cited
UNITED STATES PATENTS

| 3,476,028 | 11/1969 | Namba et al. | 95/10 CD |
|---|---|---|---|
| 3,651,324 | 3/1972 | Carter et al. | 95/10 CD |
| 3,461,786 | 8/1969 | Sato et al. | 95/64 D |
| 3,452,656 | 5/1969 | Ruhle et al. | 95/10 C |
| 3,470,798 | 10/1969 | Miyakawa | 95/10 C |
| 3,479,936 | 11/1969 | Land | 95/10 C |
| 3,455,227 | 5/1969 | Sata et al. | 95/64 D |
| 3,539,252 | 11/1970 | Gleason, Jr. | 95/64 R |
| 3,430,053 | 2/1969 | Westhaver | 95/10 C |
| 3,476,028 | 11/1969 | Namba et al. | 95/10 C |
| 3,511,143 | 5/1970 | Rentschler | 95/10 C |
| 3,464,773 | 9/1969 | Waz | 95/10 C |
| 3,547,548 | 12/1970 | Reich | 95/10 C |

Primary Examiner—Samuel S. Matthews
Assistant Examiner—Russell E. Adams, Jr.
Attorney—McGlew and Toren

[57] ABSTRACT

In the photographic exposure control system disclosed, a bridge circuit includes at least one photosensitive element. Three arms of the bridge are variable resistors set to respective photographic conditions. The photosensitive element is coupled into the bridge by a transistor amplifier which forms the fourth arm. A differential amplifier circuit is actuated by the out-put of the bridge, and operates an electromagnetic device which adjusts a diaphragm on the basis of the light sensed by the photosensitive element. The operation of the diaphragm is fed back to the bridge either by placing the element behind the diaphragm or by adjusting one of the resistors automatically as the diaphramg changes. The system further includes a damping coil which prevents overshoot of the diaphragm.

8 Claims, 12 Drawing Figures

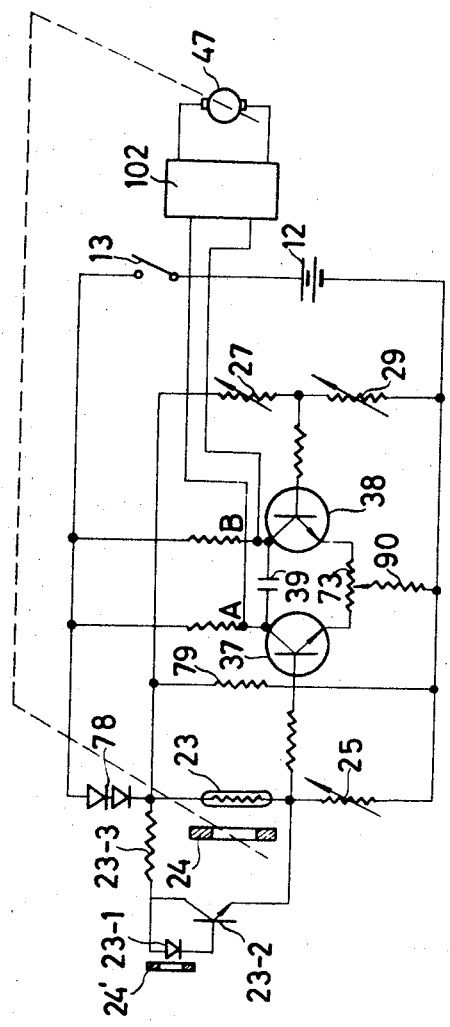

AN EXPOSURE CONTROL SYSTEM FOR A PHOTOGRAPHIC SYSTEM

The present invention relates to an exposure control system forming a part of a photographic system, and particularly to improvements in stability against temperature differences in such systems.

Conventionally, the electromagnetic devices of cameras are controlled by a comparator circuit having switching transistors of the p-n-p and n-p-n types. These transistors have a common base electrode and a common emitter electrode and the input circuits of the complimentarily combined switching transistors are connected between the output terminals of the comparator circuit. In the above types of conventional cameras many thermistors are required for temperature compensation. This complicates the circuit.

One of the objects of the present invention is to provide an improved exposure control system for a camera having an objective lens.

According to the invention, such an exposure control system comprises; a diaphragm aperture, a comparator circuit having at least one photosensitive element, a diaphragm adjusting means, a movable element influenced by said diaphragm adjusting means, a differential amplifier circuit, and an out-put circuit. An out-put value in said out-put circuit responds to a quantity of light received by said photosensitive element.

According to another aspect of the invention the exposure control system comprises a comparator circuit having at least one photosensitive element, a movable element, a differential amplifier circuit and an out-put circuit, wherein said movable element is influenced by an out-put of said out-put circuit. The differential amplifier circuit is actuated by a power source, and said comparator circuit is actuated by the energy source, said energy source having a voltage different from that of the power source, but being transferred from the power source.

According to still another aspect of the invention, an exposure control system comprises a diaphragm aperture, a comparator circuit having at least one photosensitive element, a beam splitter means disposed behind the objective lens system, a diaphragm adjusting means, a movable element influenced by said diaphragm adjust means, a differential amplifier circuit, and out-put circuit. The photo-sensitive element is disposed at a side of the beam splitter means and the diaphragm adjusting means is actuated by an out-put of the out-put circuit.

According to another feature of the invention, the output of the comparator circuit constitutes the input of the differential amplifier circuit. An output of the differential amplifier circuit controls an output of the output circuit. The output of the output circuit controls the comparator circuit. The latter itself comprises a Wheatstone type bridge with a bi-polar characteristic. Each branch of the bridge includes an output transistor so that the bridge functions in response to an input to each of the output transistors.

According to another aspect of the invention, the system includes a second differential amplifier circuit. The first and second differential amplifier circuits are actuated by an output of the comparator circuit. The control circuit is controlled by an output of the second differential amplifier circuit, and an electromagnetic device is coupled from the control circuit to the comparator circuit to bring the comparator circuit into a balanced state.

Other objects of the present invention will be understood from the following description of the embodiments of the invention shown in the accompanying drawings.

FIG. 4 is a similar circuit construction shown in FIG. 2 with modification of power source in particular.

Figure 1:
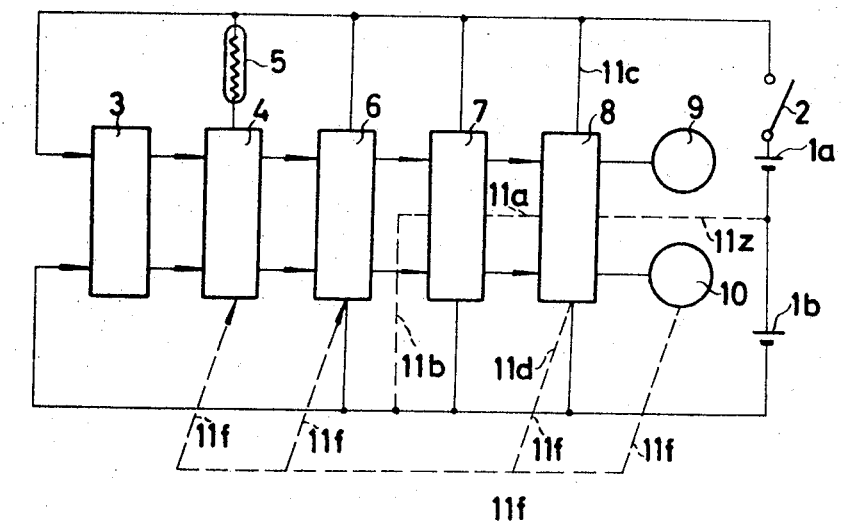
FIG. 1 is a schematic diagram showing a construction of an exposure control system according to the present invention.

FIG. 1, illustrates power sources 1a and 1b, a main switch 2, a supply voltage transferring circuit 3, a comparator circuit 4 with a photo-sensitive element 5, a differential amplifier circuit 6, an out-put controlling circuit 7, an out-put circuit 8, out-put indicator means 9, electromagnetic adjusting means 10 for the system. Members 11a, 11b, 11c and 11d are lead wires for one exposure control system according to the present invention, 11z is a lead wire for the other exposure control of the present invention, and 11f shows the control by the electromagnetic adjusting means 10 of the comparator circuit 4 in a balanced state as well as the damping of the system particularly the electromagnetic adjusting means 10. In the latter case, the damping responds to the out-put change to the time.

Figure 2:
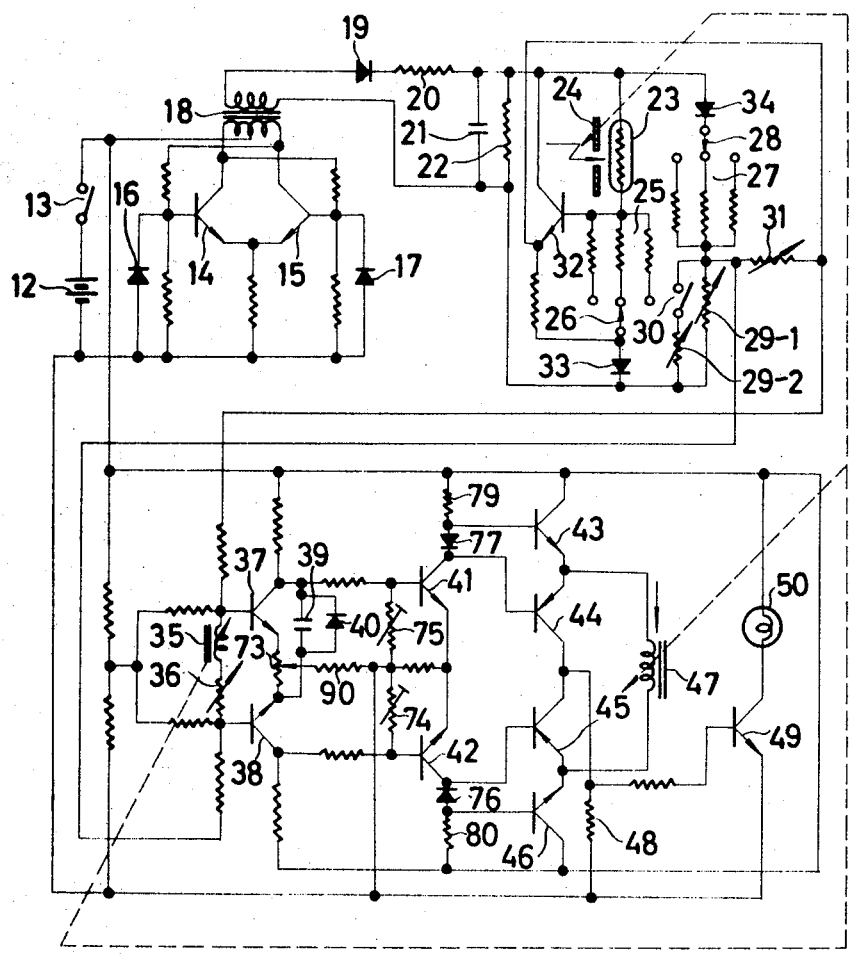
FIG. 2 shows a circuit construction of one embodiment of the exposure control system according to the present invention.

In FIG. 2, which shows an automatic exposure control system suitable for a cinematographic camera, 12 is a battery, 13 is a main switch, 14 and 15 are transistors constituting an oscillator circuit, 16 and 17 are diodes for protection of the transistors 14 and 15 respectively, 18 is a transformer. The transistors 14 and 15, the diodes 16 and 17, and the transformer 18 constitute a part of a D.C. booster circuit. Member 19 is a rectifier diode. Resistors 20 and 22 and a capacitor 21 constitute a filter circuit for smoothing an out-put of the booster circuit. A photoconductor 23 such as of CdS responds to light through an automatic diaphragm adjusting mechanism 24. One of a group of resistors 25 for presetting a film sensitivity, constitutes a branch of a Wheatstone type bridge circuit. A change-over switch 26 selects one among the group of resistors 25 in response to the sensitivity of film used. A group of resistors 27 for presetting numbers of picture frames per second, constitutes a branch of the Wheatstone type bridge. A change-over switch 28 selects one among the group of resistors 27 in response to the number of picture frames per second. A variable resistor 29–1 adjusts for the luminance of an image plane, and a resistor 29-2 serves for correction due to placement of a color conversion adjusting filter. A switch 30 for the resistor 29-2, is automatically actuated in engagement with the displacement of the color conversion adjusting filter.

The Wheatstone type bridge is composed of impedance means 23, 25, 27 and 29-1, (29-2).

A variable resistor 31, connected between the output terminals of the bridge, adjusts the out-put impedance of the bridge. An amplifier transistor 32 for an out-put current from the bridge furnishes the system a wide dynamic range in exposure value EV. System diodes 33 compensate for voltage and temperature changes in the transistor 32. A modified bridge used as a comparator circuit comprises the impedance means 23, 25, 27, 29-1 and 29-2 and the transistors 32 and the diodes 33 and 34. Member 35 is a damping coil of a servo-motor, and member 36 is a resistor for adjusting damping effects of the servo-motor. Transistors 37 and 38 form a differential amplifier circuit. A capacitor 39 serves for preventing oscillation in the circuit, and a diode 40 for preventing damage of the capacitor 39 in case the capacitor 39 is not operating properly. Transistors 41 and 42 constitute an inverting differential amplifier circuit. Transistors 43 to 46 constitute an output control circuit. The control circuit comprises a Wheatstone type bridge with a bi-polar characteristics. Each branch of the bridge has an out-put circuit of each of the transistors 43 to 46 so that the bridge functions in response to an in-put to each of the transistors 43 to 46 connected to the inverting differential amplifier circuit. A driving coil 47 drives the servo-motor, and a load resistor 48 detects unbalanced out-put. Member 49 is a transistor in an indicator circuit and 50 is a lamp.

When the main switch 13 is closed, the oscillator circuit with the transistors 14 and 15 starts to oscillate, and an out-put results in a secondary coil of the transformer 18. The out-put, after half-wave rectification through the diode 19, is applied to a smoothing filter circuit, and converted a direct current through the filter circuit. The resulted direct current activates the bridge circuit which acts as a comparator circuit, thus a high voltaged D.C. power source is supplied to the bridge circuit. Because the bridge circuit serving as a comparator is composed of a photo-conductor and three variable resistors for presetting film sensitivity, picture frames per second and adjusting illumination of the luminance of an image plane, various combinations of photographic conditions may be achieved. The the resistance value of the photo-conductor is decided by the quantity of light received, and therefore, under a very weak luminance the resistance value becomes very high. In this way, the unbalanced current flowing from out-put terminals of the bridge is so small that a precise detection of the balanced state of the bridge becomes difficult. For overcoming the difficulty, the transistor 32 is used to amplify the out-put current of the bridge. Thus amplied current is passed to the differential amplifier circuit as a precise detector circuit. The diodes 33 and 34 are inserted in two branches of the bridge for compensation of the voltage VcE of the output circuit of the transistor 32. Variable resistor 31 for adjusting the value of out-put impedance of the bridge to the detector circuit to an appropriate value is connected in parallel between the out-put terminals of the bridge. The out-put of the bridge thus modified is lead to two in-put terminals of the differential amplifier circuit with a detection or control circuit of the bi-polar type.

Either one of the two transistors turns "on" and the other one turns "off" depending on the polarity of the in-put.

When the positive potential of the bridge out-put is supplied to a base of the transistor 37 of the differential amplifier circuit, and the negative potential to the base of the transistor 38, the transistor 37 turns "on" and the transistor 38 "off". Therefore, the invertor transistor 41 comes "on" and the transistor 42 turns "off". Thus, the transistors 43 and 45, constituting an out-put control circuit "on". The current then flows in a direction as shown by an arrow through the electromagnetic device 47. Thus the servo-motor rotates in a positive direction, and drives an automatic diaphragm adjusting means 24 in engagement with the servo-motor to control the quantity of light received by the photo-conductor in a direction to achieve a balanced state of the modified bridge circuit.

The servo-motor stops rotating when the bridge reaches the balanced state and in this state an F number for correct exposure is obtained. As the unbalanced out-put from the bridge circuit flows through the damping coil 35, hunting phenomena are prevented. The unbalanced out-put in the output control circuit due to unbalance of the modified bridge flows into a load impedance 48 and the transistor 49 is under control of the voltage drop in the load impedance 48. Thus, the indicator lamp 50 is switched on to illuminate and indicates or warns of the unbalanced state of the modified bridge. In this way the warning of over-exposure and under exposure is made possible with only one indicator lamp 50, and yet this very lamp 50 indicates a balanced state as the lamp darkens in a balanced state of the modified bridge.

Figure 3:
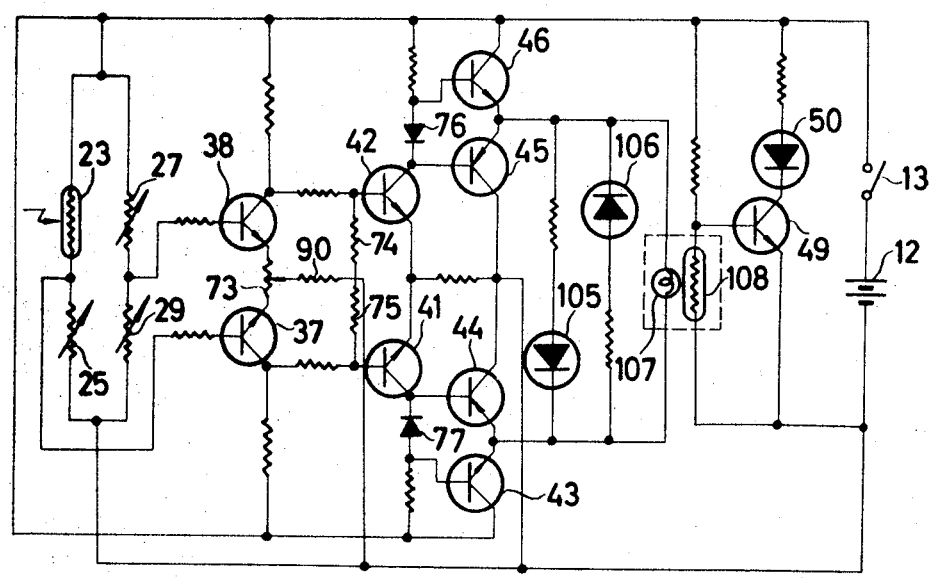
FIG. 3 shows a circuit construction particularly illustrating modification of an indicator circuit of the exposure control system according to the present invention.

In FIG. 3, the impedance means 23, 25, 27 and 29 constitute a bridge circuit used as a comparator. An unbalanced out-put from the bridge circuit is detected by a bi-polar amplifier with an in-put differential amplifier and an inverting differential amplifier circuit. The transistors 37 and 38 in combination with a trimmer resistor 73 and a bias resistor 90 and so on constitute the input differential amplifier circuit. Transistors 41 and 42 in combination with trimmer resistors 74 and 75 for bias and so on constitute the inverting differential amplifier circuit. Transistors 43, 44, 45 and 46 are connected to each other to form a Wheatstone type bridge. Diodes 76 and 77 serve to compensate VvE of the transistors respectively for the bridge. A battery 12 energizes the circuit through a main switch 13. Three photo-emissive diodes 105, 106 and 50 indicate under exposure, over exposure and correct exposure respectively. In this case, each of the photo-emissive diodes may be replaced with a lamp combined with a diode. A lamp 107 and a photo-conductor 108 are coupled together with the aid of light emitted from the lamp 107. A transistor 49 for indicates operation within predetermined range for correct exposure.

Indication of correct exposure is explained in further detail below.

The current flowing through the photo-conductor 108 as variable resistor is determined by the degree of unbalance of the comparator. This degree of unbalance is in proportion to a degree of deviation of the incident light amount from an object from a working range of the automatic diaphragm adjusting means. Thus, if the photo-conductor 108 is set at a certain position to the lamp 107, the photo-emissive diode illuminates when the deviation of the system from the correct exposure is beyond a certain degree.

After calibrating the photoconductor with the deviation of exposure value. The resistance of the photoconductor is adjusted to obtain a value at which the photo-emissive diode starts to illuminate, the deviation of light quantity of the object may be determined from the above obtained value. Also by setting the exposure value permissible and by setting resistance of the photoconductor 108 within a range of permissible correct exposure, the warning diode 50 illuminates at a boundary if permissible under- or over-exposure value. Thus, the warning diode 50 starts to illuminate at the boundary of under- or over-permissible depending on the latitude of the film.

In FIG. 4, impedance means 23, 25, 27 and 29 constitute a bridge which is used as a comparator. The photoconductor 23 serving as an impedance means may be replaced with a photo-diode 23-1 combined with a transistor 23-2 and a resistor 23-3. This can be done, for example, when the photo-diode is used as a photosensitive element, the time response of which is so quick that a damping means may be omitted, provided that the inertia of moving elements is small.

A diaphragm adjusting means 24 is controlled by the servo-motor 47. connected between the comparator circuit and the servo-motor through the controller circuit for detection.

When the impedance value of each branch of the comparator bridge of conventional system is balanced first, then the variable resistor 25 may be set to have several values $R_{25}$ of the resistors depending on the film sensitivity. And then the balanced condition for the bridge is shown $R_{23} : R_{25} = R_{27} : R_{29}$ where $R_{23}$ stands for an impedance value of the photosensitive element, and the resistant value $R_{27}$ stands for an initial adjustment and $R_{29}$ stands for picture frames per second.

Next, when $R_{29}$ is adjusted in response to the picture frames per second, resistance value $R_{29}$ may vary, thus $R_{23} : R_{25} = R_{27} : R_{29}$ have a different balanced state. In order to prevent the balanced state from deviating in the above case, diodes 78 and a resistor 79 are provided. A bleeder circuit of the diode 78 and the resistor 79 serve as voltage transferring means. With aid of the diodes 78 and the resistor 79, the comparator bridge responds in a wide range of exposure value. A control circuit is designated 102. In this case, the potential supplied to the bridge becomes lower than potentials of other circuits. Therefore, the effects on the amplifier circuit by the change over of the resistance value $R_n$ can be reduced, and thus bias applied to the input of circuit of the amplifier circuit becomes stable.

The above considerations are not required if the power source for the comparator bridge and the power source for the amplifier circuit or output circuit are separate and independent of each other.

Figure 5:
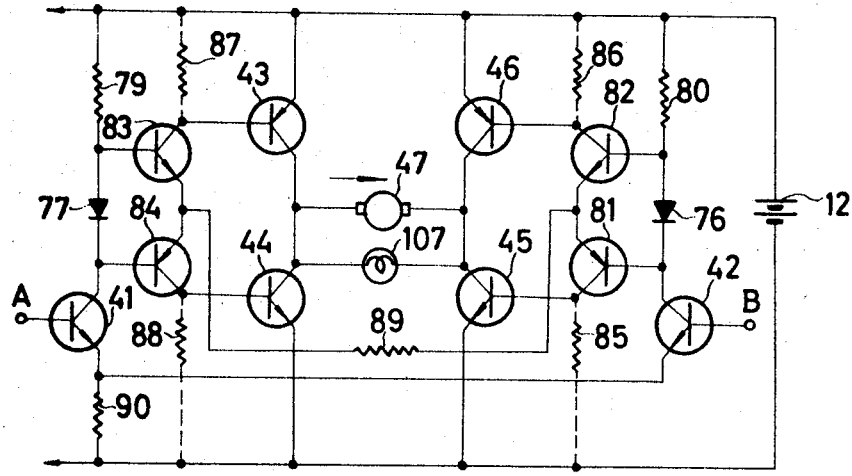
FIGS. 5 and 6 show respectively a part of a circuit construction the exposure control system according to the present invention.

In FIG. 5, A and B are terminals for a bi-polar amplifier circuit similar to the circuit shown in FIGS. 2 and 3. Exciter transistors 81, 82, 83 and 84 are provided between the differential amplifier composed of the transistors 41 and 42 and the control bridge composed of the transistors 44 – 46. Impedance means 76, 77, 79, 80, 85, 86, 87, 88 and 90 may be used in combination for constituting the system if necessary.

The current supplied from the battery 12 flows through the servo-motor 47 and the indicator lamp 115 in response to potential differences between the terminals A and B.

An impedance means 89 disposed among exciter transistors 81 to 84 serves for protecting the amplifier circuit, particularly protecting the transistors from damage due to excessive current.

Figure 6:
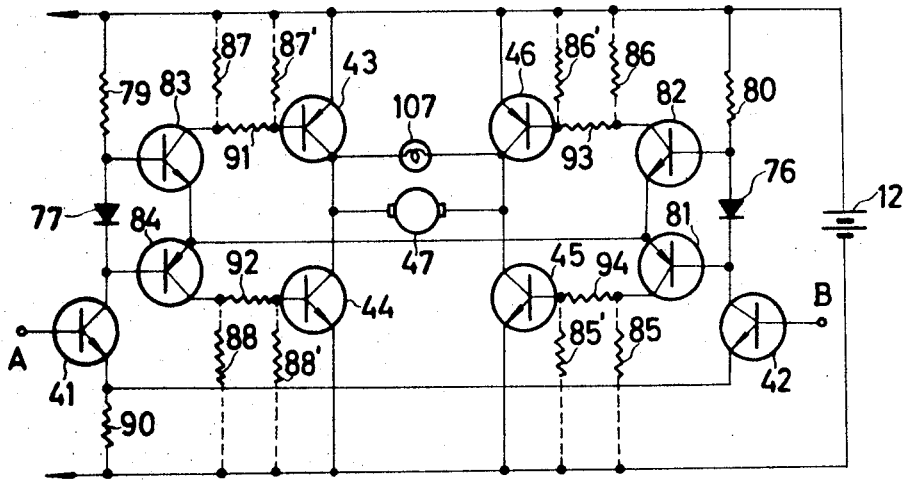

FIG. 6 shows a similar system as shown in FIG. 5. Impedance means 94, 93, 92 and 91 for protection of the circuit are desposed between respective exciter transistors 81, 82, 83 and 84 and output transistors 45, 46, 43 and 44. Impedance means 85', 86', 87' and 88' may be used in place of or in combination with impedance means 85, 86, 87 and 88.

Figure 7:
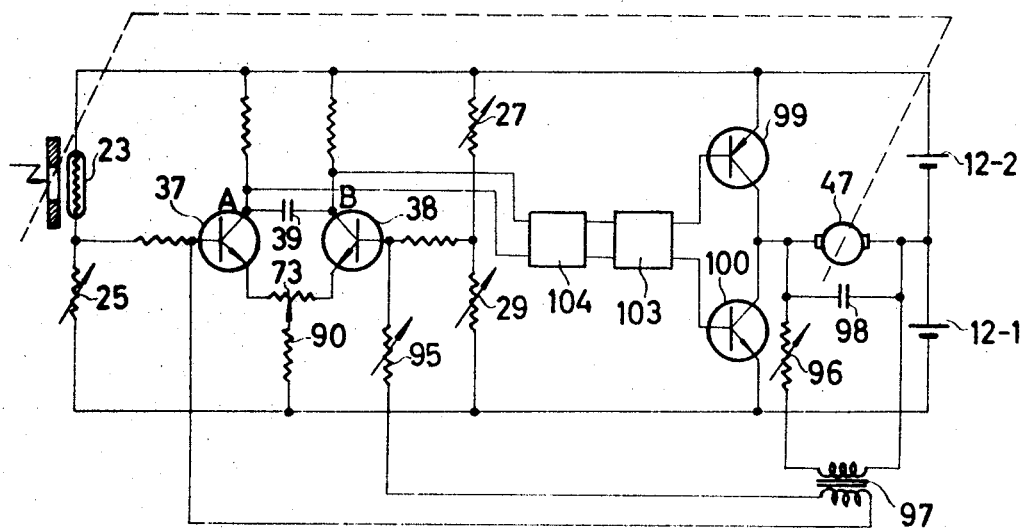
FIGS. 7, 8 and 9 show respectively a similar circuit construction shown in FIG. 2 with modification of a damping circuit in particular.

In FIG. 7, elements 23, 25, 27 and 29 are resistors for comparator. Element 104 is a differential amplifier circuit, 103 is a control circuit such as a complimentary circuit and 99 and 100 are switching transistors. Variable resistors 95, 96, a capacitor 98, a transformer 97, form a damping means. 12–1 and 12–2 are batteries. The servo-motor 47 controls diaphram adjusting means 24 so as to obtain a predetermined resistance value of the photoconductor 23.

Transistors 37 and 38 are for the first bi-polar differential amplifier. In this embodiment no additional device is required to a driving motor, but an additional damping circuit is required to the control circuit. The damping circuit feeds back an alternating out-put originated by the hunting of the servo-motor from both terminals of the servo-motor from both terminals of the servo-motor to both input terminals of the first differential amplifier, thus preventing the hunting phenomena.

Figure 8:
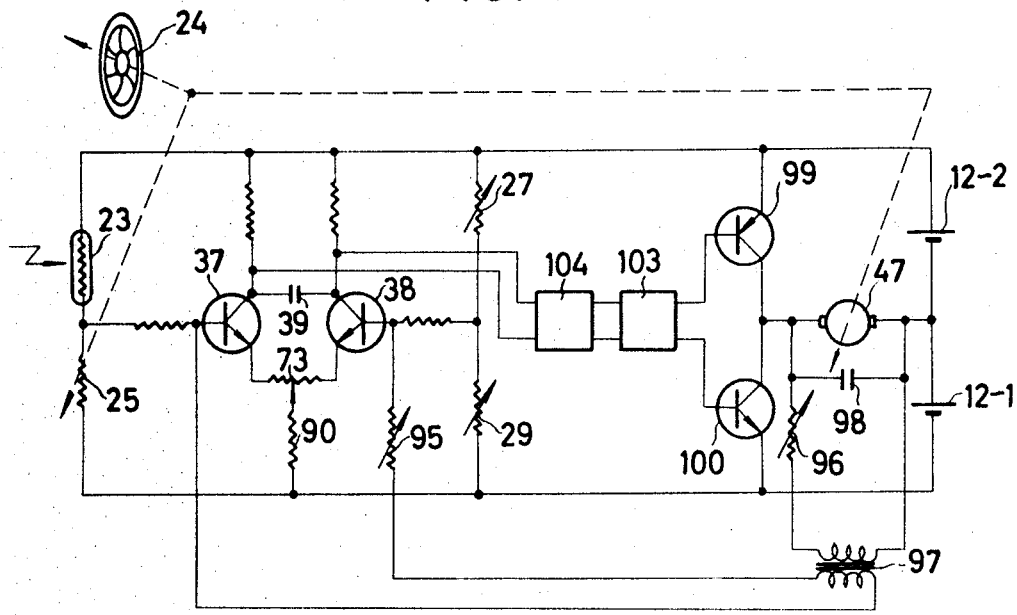

FIG. 8 shows a system similar to that shown in FIG. 7, but in this case the servo-motor 47 controls a diaphragm adjusting means provided outside of the light path for the photoconductor 23. It also controls a resistor means 25 for compensation of F number of the diaphragm adjusting means. In this case, the diaphragm adjusting means 24 may be of a presetting type suitable for a single lens reflex camera or the diaphragm aperture of the means 24 may directly responds to the movement of the servo-motor 47.

Figure 9:
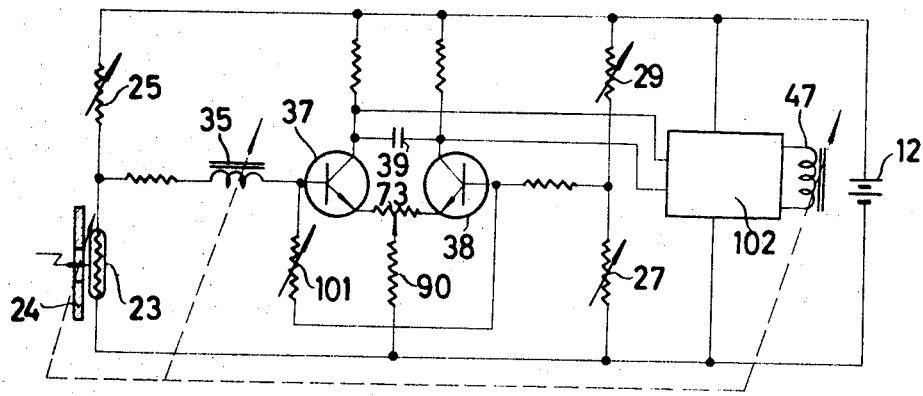

In FIG. 9, a variable resistor 101 serves as a trimming means and 102 is a detection circuit. A driving coil 47 is combined with a damping coil 35 to form a coil unit.

Figure 10:
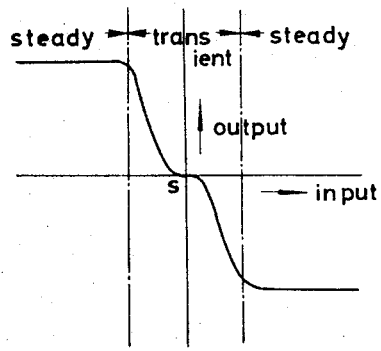
FIG. 10 shows damping chracteristics of an out-put to an in-put.

FIG. 10 shows the transient characteristics of the system according to the present invention, particularly in case of the embodiments shown in FIGS. 2, 7, 8 and 9. The abscissa shows the input to the input differential amplifier circuit, the ordinate stands for an output of the servo-motor. The character S stands for a zero input difference and zero output, that is, it stands for balanced conditions. In a steady state, even if the input changes suddenly the output does not change. In a transient state, damping effects are remarkable; in other words, in an accelerated or decelerated state of the servo-motor 47 of the system, hunting phenomena are prevented.

Figure 11:
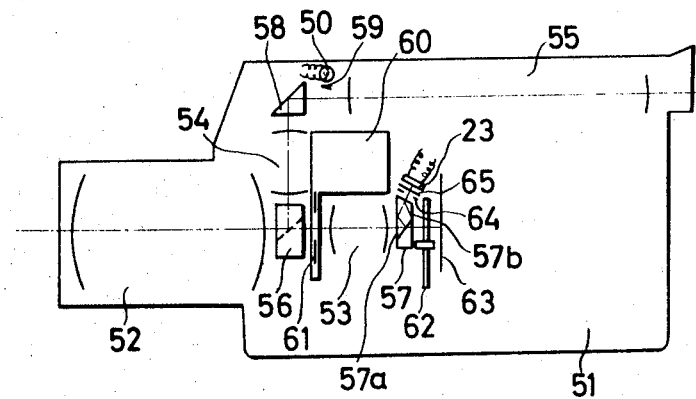
FIG. 11 shows a brief systematic arrangement of a camera according to the present invention.

FIG. 11 shows an optical arrangement of a camera with an exposure control system according to the present invention, in which element 51 is a camera body, 52 is a magnification changing system, such as an afocal system, of a zoom lens. Member 53 is an imaging lens or a relay lens of zoom lens, 54 is an objective lens for a finder and 55 is a main part of a finder system. It is preferable to dispose a field mask, warning marks, F number scale and an indicating window of footage counter for showing the amount of remaining film on the imaging plane in the middle of the finder system 55. Element 56 is a beam splitter for splitting the incident light to the lens system 52 into a light for photographing and a light for monitoring through the finder.

A beam splitter 57 leads the light for photographing onto a film 63 and onto a photosensitive element 61. The beam splitter 57 comprises a half mirror 57–a disposed at an angle of approximately 60° to the optical axis of the relay lens 53, and the end surface 57b of the beam splitter 57 facing to the photosensitive element 61 is formed at an angle of about 30° to the optical axis.

With the beam splitter arranged in this above manner, the thickness of the beam splitter may be reduced to prevent deterioration of imaging quality as well as to minimize the size of a light measuring device as compared with the case where the half mirror is disposed at an angle of 45° to the optical axis.

Figure 12:
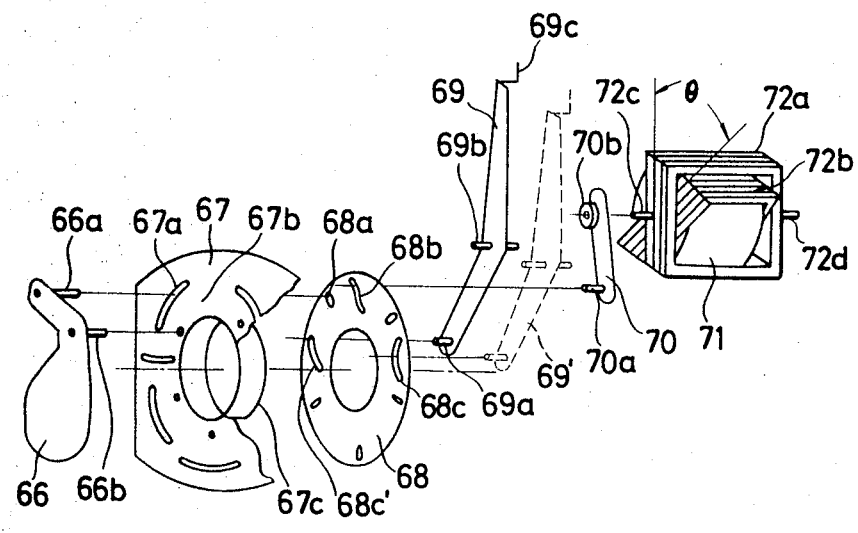
FIG. 12 shows a diaphragm adjusting mechanism in a camera according to the present invention.

Member 58 is a total reflection prism, 59 is a prism for introducing light signals of the indicator lamp 50 illuminated in an incorrect exposure condition into an appropriate portion of the finder mask. The prism 59 is located in the proximity of the first image plane of the objective lens 54 of the finder, and the light signals from the prism 59 illuminate a warning mark provided on the second imaging plane among the finder system 55. Member 60 is a diaphragm driving unit as illustrated in FIG. 12, a photosensitive element 23 is provided on or near the plane corresponding to the focal plane of the imaging lens 53. Member 61 is a diaphragm aperture in the unit 60, and 62 is a rotary shutter. Member 63 is a film, 64 is a mask defining the measurement field and 65 is an N.D. filter for example for sensitivity adjustment of the photosensitive element 23. This filter may be omitted.

In FIG. 12, member 66 is one of five diaphragm blades (other four blades are not shown), provided with pins 66–a and 66–b. The former pin 66–a extends through the groove 67a on the fixed member 67 to be engaged with a groove 68–a on the disc 68. The latter pin 66–b engages with a hole 67b of the fixed member 67. The disc 68 is supported slidably on the cylindrical journal of the fixed member 67. The disc 68 is provided with grooves 68–b and 68–c. The former groove 68–b engages a pin 70–a fixed on the first driving lever 70. The groove 68–c engages with the pin 69–a fixed on the second indicator lever 69 with a pointer 69–c for indicating F numbers in neighborhood of a finder field. The first driving lever 70 has a collar 70–b connected with a center pin 72–c fixed to a coil 72–a. The coil 72–a is coupled with a coil 72–b to form a coil unit with a relative angle of $\theta$. A permanent magnet 71 urges to rotate the coil 72–a to rotate when the current is passed to the coil 72–a, thus rotating the diaphragm blade 66 around the pin 66–b as well as the pointer 69–c around the pin 69–b, and causing electromotive force in the coil 72–b. In case the angle $\theta$ between the coils 72–a and 72–b is small, both the coils approach a transformer-like coupled state. The current supplied to the coil 72–a causes an undesirable inductive electromotive force corresponding to the supplied current in the coil 72b.

While in case a large angle $\theta$ of about 90°, the coil 72–b serves best as a detecting coil of counter electromotive force. However in this latter case an angle for rotation of both coils is not large enough. Thus it is difficult to provide a preferable diaphragm driving means. It is also difficult to apply a simple bi-polar permanent magnet as satisfactory flux distribution is not easily obtained only when a complicated permanent magnet is prepared.

For the above reasons, an angle of about 30° between the coils 72–a and 72–b is preferably preselected.

The coil unit may be modified in such a manner that the unit is composed of three coils; one coil for driving, a second coil for detection and a third coil for damping. In this modification, the functions of the driving coil, the detection coil and the damping coil are advantageously separated for a circuit construction.

The coil unit may be modified to respond to rotating over a wider range wit a change-over switch.

The exposure control system according to the present invention has the following advantages, singly or in combination. As the system adopts the voltage of a power source and the voltage transferred from the power source as a power source for control circuit and a power source for comparator circuit respectively, it is possible to achieve a high accuracy of automatic exposure control with a single common power source.

A single indicator lamp can serve to indicate under exposure, over exposure and correct exposure. As the system adopts a differential amplifier circuit, the detection sensitivity is easily improved without deterioration due to temperature changes in a wide range.

As the angle of the half mirror of a planar beam splitter for the photosensitive element to the optical axis is complementary to the angle of the outer surface, facing to the photosensitive element, of the beam splitter to the optical axis, the photosensitive element is easily provided near the optical path of a photographing light. Yet simplification of its mechanical construction results in a minimum camera size.

What is claimed:

1. An exposure control apparatus for a photographic camera having an objective lens system, comprising diaphragm means mounted to form an aperture in the objective lens system, a Wheatstone bridge having four branches, photosensitive means on one of said branches for receiving light from an object to be photographed, three resistor means each in the other of said branches, at least one of said resistor means correcting for an exposure factor, a differential amplifier circuit including at least one pair of transistors of the same polarity, said Wheatstone bridge having an output, said transistors each having an input electrode connected with the output of said Wheatstone bridge, a driving circuit connected with the output of said differential amplifier circuit for producing a current that responds to the output of said differential amplifier circuit, an electromagnetic device electrically coupled to the output of said output circuit and connected with said diaphragm means for varying the opening of said diaphragm means, said electromagnetic device being coupled to at least one of said branches in said Wheatstone bridge for adjusting the bridge so that the bridge assumes a balanced condition, damping coil means in said electromagnetic device, coupling means for coupling said damping coil to said input electrodes of said transistors for preventing said diaphragm means from producing irregular responses.

2. A photographic apparatus as in claim 1, further comprising indicator means actuated in response to the quantity of light received by the photosensitive element.

3. A photographic apparatus according to claim 1, wherein said differential amplifier includes a power source, said comparator having a voltage different from that of the power source but derived from said power source.

4. An exposure control system for a camera having an objective lens system, comprising diaphragm means mounted to form an aperture in said objective lens system, a comparator circuit including photosensitive means and three resistor means connected to form a Wheatstone bridge, said comparator circuit having output terminals, diaphragm adjusting means operatively connected with said diaphragm means for adjusting said diaphragm means, a differential amplifier circuit including at least a pair of transistors of the same polarity connected to the output terminals of said comparator circuit and an output circuit, said transistors having respective input electrodes, said output circuit including an electromagnetic device coupled to said diaphragm adjusting means for actuating said diaphragm adjusting means, said output circuit producing an output value corresponding to a quantity of light received by said photosensitive element, damper means including a damping coil magnetically interlinked with said electromagnetic device, and coupling means for coupling said damping coil to said input electrodes of said transistors in order to prevent irregular responses, said diaphragm adjusting means being actuated by said electromagnetic device under the control of said damping coil.

5. A photographic apparatus according to claim 4, wherein the photosensitive element is disposed behind the objective lens system of the camera.

6. A photographic apparatus as in claim 4, in which the output circuit comprises a second Wheatstone bridge having bipolar characteristics, each branch of said other Wheatstone bridge having an amplifier so that said other bridge may function in response to an input to each of said amplifiers connected to the differential amplifier circuit.

7. A photographic apparatus as in claim 4, wherein said photosensitive element is located outside of the path of light passing through said diaphragm means, and wherein connector means connect the output of said output circuit to one of said resistor means for adjusting the resistor means in response to the output of said output circuit so as to vary the balance of said comparator circuit.

8. A photographic exposure control system for a camera with an objective lens, comprising diaphragm means mounted to form a aperture in said objective lens, photosensitive means located outside of the path of light passing through said diaphragm means, variable means forming with said photosensitive means a sensing ciruicit having a pair of transistors of the same conductive type which produce a signal indicative of the light to which said photosensitive means is exposed, said transistors having respective bases control circuit means responsive to said signal, said control circuit means for adjusting said diaphragm means, coupling means for coupling said control circuit means to said variable means for varying the output of said sensing cirucit in response to the output of said control cirucit means and thereby reduce the output of said sensing circuit as the adjustment of said diaphragm means comes closer to that determined by said photosensitive means, magnetic means electrically coupled to the output of said control means for generating a magnetic flux in accordance with the output of the control circuit means, and a damping coil coupled to said magnetic means, and coupling means for coupling said damping coil to said bases of said transistors for preventing irregular responses from said sensing means, said diaphragm means being actuated by said control circuit means under the control of said damping coil.

* * * * *

UNITED STATES PATENT OFFICE
CERTIFICATE OF CORRECTION

Patent No. 3,747,487         Dated July 24, 1973

Inventor(s) Kinji Tanikoshi and Tomoshi Takigawa

It is certified that error appears in the above-identified patent and that said Letters Patent are hereby corrected as shown below:

In the heading of the patent:

Add to the recitation of the Foreign Application Priority Data the following:

```
--May 21,   1969 Japan................44/46952
  May 27,   1969 Japan................44/48922
  May 27,   1969 Japan................44/48923
  July 16,  1969 Japan................44/67686
  Sept. 3,  1969 Japan................44/83739
  Sept. 24, 1969 Japan................44/91211
  March 24, 1970 Japan................44/1284--.
```

Signed and sealed this 29th day of October 1974.

(SEAL)
Attest:

McCOY M. GIBSON JR.           C. MARSHALL DANN
Attesting Officer             Commissioner of Patents